United States Patent [19]

Ishikawa et al.

[11] Patent Number: 5,719,660
[45] Date of Patent: Feb. 17, 1998

[54] EXPOSURE APPARATUS HAVING A PLZT SHUTTER, A MULTI-COLORED FILTER DISC AND A SHIELDING MEMBER TO BLOCK EXPOSURE LIGHT

[75] Inventors: Masazumi Ishikawa; Tohru Tanibata, both of Wakayama, Japan

[73] Assignee: Noritsu Koki Co., Ltd., Wakayama, Japan

[21] Appl. No.: 578,995

[22] Filed: Dec. 27, 1995

[30] Foreign Application Priority Data

Dec. 27, 1994 [JP] Japan ................... 6-326155

[51] Int. Cl.$^6$ .................... G03B 27/72; G03B 33/02
[52] U.S. Cl. ................... 355/35; 355/67; 355/32; 355/71
[58] Field of Search ................... 355/35, 71, 67, 355/32

[56] References Cited

U.S. PATENT DOCUMENTS 5,231,537  7/1993  Hama ....................... 359/889
5,488,450  1/1996  Tanibata ..................... 355/38

FOREIGN PATENT DOCUMENTS 62-185456  8/1987  Japan.

Primary Examiner—R. L. Moses
Assistant Examiner—Shival Virmanl
Attorney, Agent, or Firm—Wenderoth, Lind & Ponack

[57] ABSTRACT

An exposure apparatus has a color shifter disk which comprises blue, green and red color filters, formed by dividing the disk into three sectors, and a light shielding member arranged for moving into and out from the light path in synchronization with the rotating movement of the color shifter disk. The light shielding member advances into the light path to interrupt the exposure light when a boundary between two adjacent color filters of the color shifter disk moves into the light path, and retracts from the light path to pass the exposure light when the boundary between two adjacent color filters of the color shifter disk departs from the light path.

9 Claims, 8 Drawing Sheets

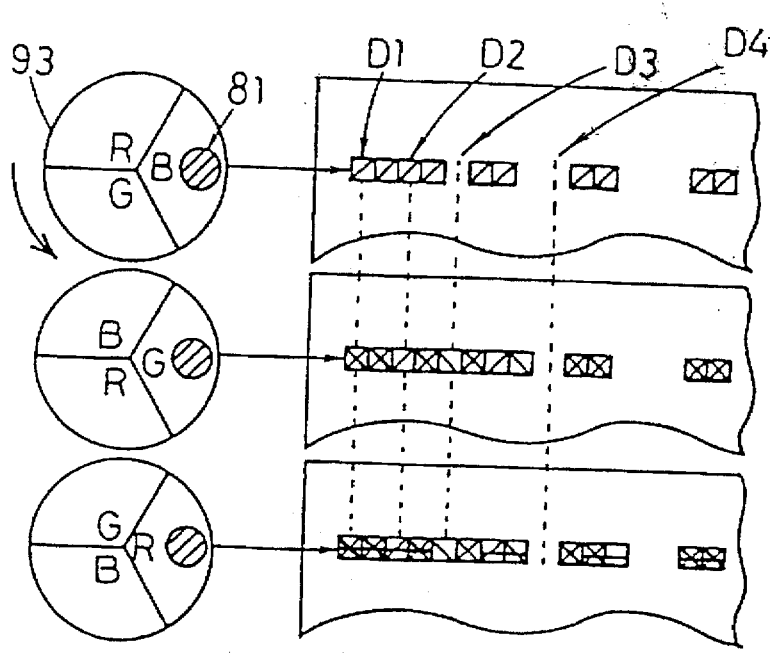
Fig.4(A)
Fig.4(B)
Fig.4(C)
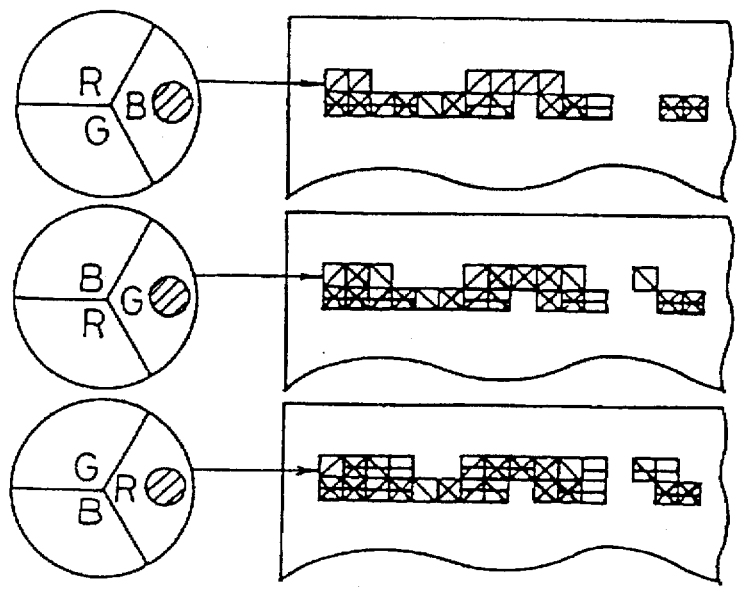
Fig.4(D)
Fig.4(E)
Fig.4(F)

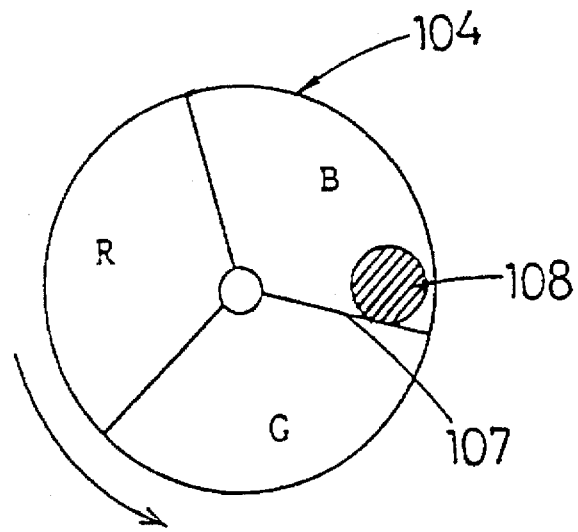
Prior Art Fig.11(A)
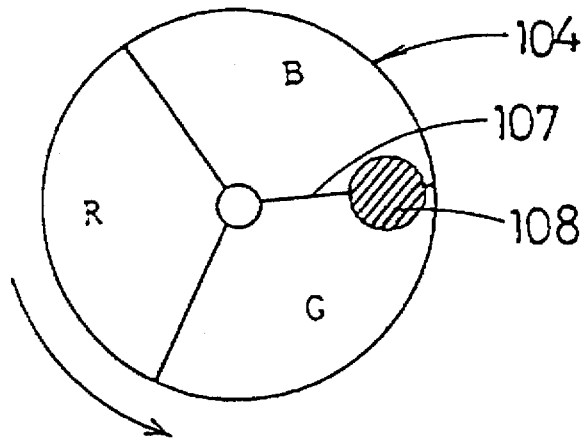
Prior Art Fig.11(B)
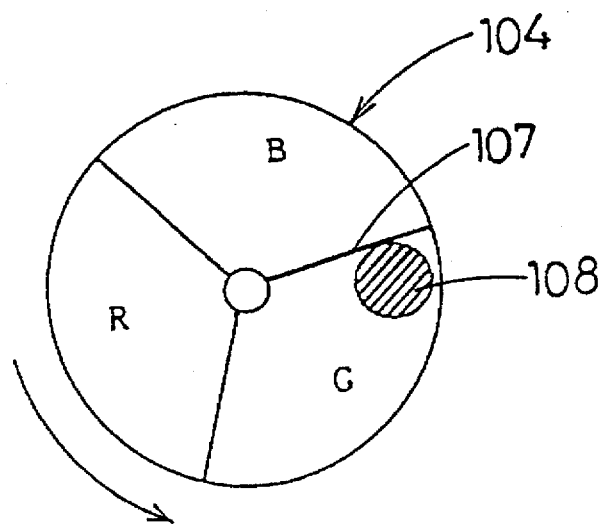
Prior Art Fig.11(C)

EXPOSURE APPARATUS HAVING A PLZT SHUTTER, A MULTI-COLORED FILTER DISC AND A SHIELDING MEMBER TO BLOCK EXPOSURE LIGHT

BACKGROUND OF THE INVENTION

The present invention relates to an exposure apparatus for use in a photographic printer and more specifically, to a digital exposure apparatus equipped with a PLZT or liquid crystal exposure shutter.

A conventional exposure apparatus is provided, as shown in FIG. 10, in which photosensitive papers (not shown) are exposed to blue, green, and red (referred to as BGR), colored light produced by their respective color filters 101, 102, and 103 of a color shifter disk 104 which is disposed across the light path which extends from a light source 105 to a light receiving surface 108 of a bundle of optical fibers 106. While a boundary 107 between two adjacent color filters of the color shifter disk 104 moves across the light path, a mixture of their colors falls on the light receiving surface 108 of the optical fiber bundle 106. For this reason, a PLZT shutter (not shown) is momentarily turned off during the shifting movement of the disk 104.

However, it is inadequate to interrupt an intensity of exposure light by turning off the PLZT shutter since a leakage of the light will be perceived by the photosensitive papers, thus declining the quality of printing.

Also, a considerable length of time is necessary for the boundary 107, between the two filters, to pass through the light receiving surface 108 of the optical fiber bundle 106. Accordingly, the shifting movement will be slow compared with the exposure time thus inhibiting an increased quality of printing.

The shifting time relative to the exposure time may be shortened by increasing the diameter of the color shifter disk 104, but this is not very practical.

It is an object of the present invention, in view of the foregoing, to provide an exposure apparatus which is capable of eliminating a leakage of the exposure light during the shifting from one color to another and to shorten the duration of the shifting so as to prevent the quality of printing from declining.

SUMMARY OF THE INVENTION

An exposure apparatus according to the present invention is provided with a light source, a PLZT exposure shutter, a bundle of optical fibers for transmitting an intensity of light from the light source to the exposure shutter, and a color shifter disk which comprises B, G, and R, color filters which are formed by dividing the disk into three sectors. The disk, while rotating, allows each of the three filters to move across the light path between the light source and a light receiving face of the bundle of optical fibers for producing B, G, and R colors of exposure light to which a photosensitive material is exposed to form a pattern of dots. More specifically, the exposure apparatus is characterized by a light shielding member arranged for moving in and out of the light path in synchronization with the rotating movement of the color shifter disk, in which the light shielding member advances into the light path so as to interrupt the exposure light when a boundary between two adjacent color filters of the color shifter disk runs across the light path, and retracts from the light path so as to pass the exposure light when the boundary between two adjacent color filters of the color shifter disk departs from the light path.

The exposure apparatus may be arranged such that the light receiving face of the bundle of optical fibers is flattened so that it extends along the boundary of two adjacent color filters of the color shifter disk which runs across the light path.

The exposure apparatus may be modified such that the light receiving face of the bundle of optical fibers is formed of an oval configuration.

The exposure apparatus may be modified such that the light receiving face of the bundle of optical fibers is formed of a rectangular configuration.

The exposure apparatus may be modified such that the light receiving face of the bundle of optical fibers is formed of a fan-shaped configuration which spreads from the center point of the color shifter disk.

An exposure apparatus according to the present invention is provided with a light source, a PLZT exposure shutter, a bundle of optical fibers for transmitting an intensity of light from the light source to the exposure shutter, and a color shifter disk which comprises B, G, and R, color filters which are formed by dividing the disk into three sectors and while rotating, allows each of the three filters to move across the light path between the light source and a light receiving face of the bundle of optical fibers for producing B, G, and R colors of exposure light to which a photosensitive material is exposed to form a pattern of dots. In particular, the exposure apparatus is characterized in that the light receiving face of the bundle of optical fibers is flattened so that it extends along the boundary of two adjacent color filters of the color shifter disk which runs across the light path.

The exposure apparatus may be modified such that the light receiving face of the bundle of optical fibers is formed of an oval configuration.

The exposure apparatus may be modified such that the light receiving face of the bundle of optical fibers is formed of a rectangular configuration.

The exposure apparatus may be modified such that the light receiving face of the bundle of optical fibers is formed of a fan-shaped configuration which spreads from the center point of the color shifter disk.

Each of the three color filters of the color shifter disk is rotated into the light path between the light source and the light receiving face of the bundle of optical fibers to produce B, G, and R colors of exposure light to which the photosensitive material is exposed forming a pattern of dots.

When the boundary between two adjacent color filters on the color shifter disk runs into the light path, the light shielding member is advanced into the light path to interrupt the exposure light.

As the boundary between two adjacent color filters on the color shifter disk departs from the light path, the light shielding member is retracted from the light path so as to pass the exposure light.

The light shielding member operates so as to blind, in response to the boundary on the color shifter disk running into the light path (during the shifting of one color filter to another), the light receiving face of the bundle of optical fibers which will thus be prevented from receiving any unwanted portion of light or from being double exposed.

The light receiving face of the bundle of optical fibers is flattened so that it extends along the boundary of two adjacent color filters of the color shifter disk which runs into the light path. More particularly, the width of the light receiving face of the bundle of optical fibers which extends in the direction of rotation across the boundary on the color shifter disk is shortened without changing the size of the same, thus minimizing the angular movement of the boundary across the light receiving face. As the duration of the boundary crossing the light receiving face of the bundle of optical fibers is decreased without changing the size of the light receiving face, the interval of light shielding will be minimized.

The exposure apparatus of the present invention operates such that the duration of the boundary on the color shifter disk crossing the light receiving face of the bundle of optical fibers is decreased without changing the size of the light receiving face, and the interval of blinding with the light shielding member will thus be minimized.

The exposure apparatus of the present invention has the light receiving face of the bundle of optical fibers formed of a fan-shaped configuration which spreads from the center point of the color shifter disk. This allows the boundary to run across the fan-shaped light receiving face with optimum efficiency as its angular movement matches the shape of the light receiving face, thus further minimizing the duration of the blinding action of the light shielding member.

The exposure apparatus rotates the color shifter disk so that each of the three color filters of the color shifter disk is advanced into the light path between the light source and the light receiving face of the bundle of optical fibers for producing B, G, and R colors of the exposure light to which the photosensitive material is exposed forming a pattern of dots.

During the shifting of one color to another, the light receiving face of the bundle of optical fibers is exposed to two different colors of light due to the boundary between two adjacent color filters on the color shifter disk running into it.

This effect will be minimized by the flattened shape of the light receiving face which allows the boundary to cross within a short time and thus allowing only a minimum of unwanted leakage light to pass.

The exposure apparatus is also intended to operate such that the duration of the boundary on the color shifter disk crossing the light receiving face of the bundle of optical fibers is decreased thus minimizing the interval of color shifting and allowing a minimum of unwanted light leakage.

Also, the duration of the boundary on the color shifter disk crossing the light receiving face of the bundle of optical fibers is decreased thus minimizing the interval of color shifting and allowing a minimum of unwanted light leakage.

The exposure apparatus of the present invention has the light receiving face of the bundle of optical fibers formed of a fan-shaped configuration which spreads from the center point of the color shifter disk. This allows the boundary to run across the fan-shaped light receiving face with optimum efficiency as its angular movement matches the shape of the light receiving face, thus minimizing the leakage of light.

BRIEF DESCRIPTION OF THE DRAWINGS

FIG. 4 is a diagram explaining steps of the exposure process of the embodiment;

FIG. 11 is a diagram showing the timing relation of the rotating movement between a color shifter disk and a light shielding disk of the prior art.

DETAILED DESCRIPTION OF THE PREFERRED EMBODIMENTS

Embodiment 1

Figure 1:
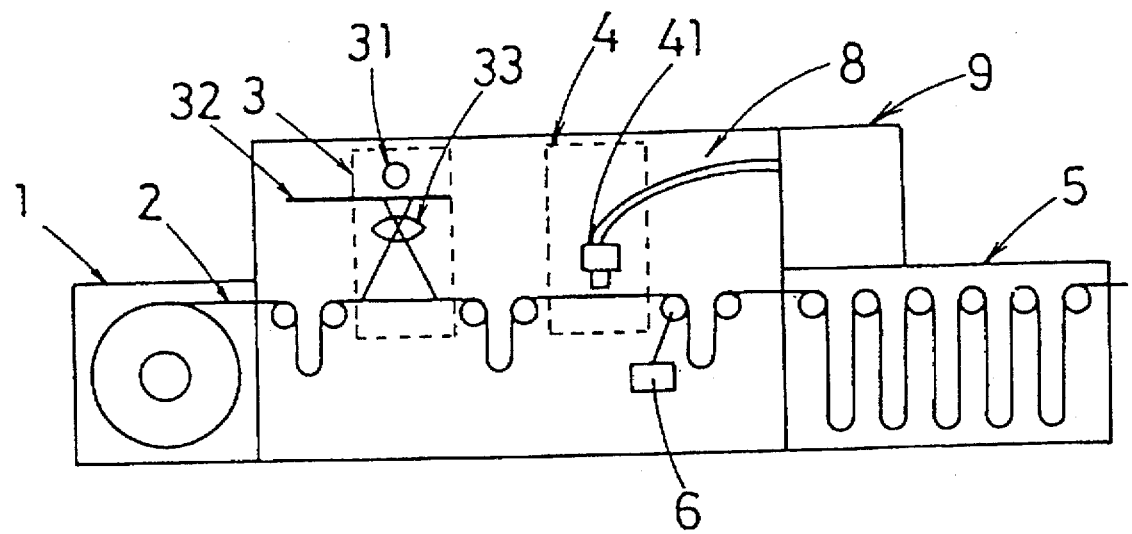
FIG. 1 is a schematic overall view of a photographic printer equipped with an exposure apparatus of the present invention.
Figure 2:
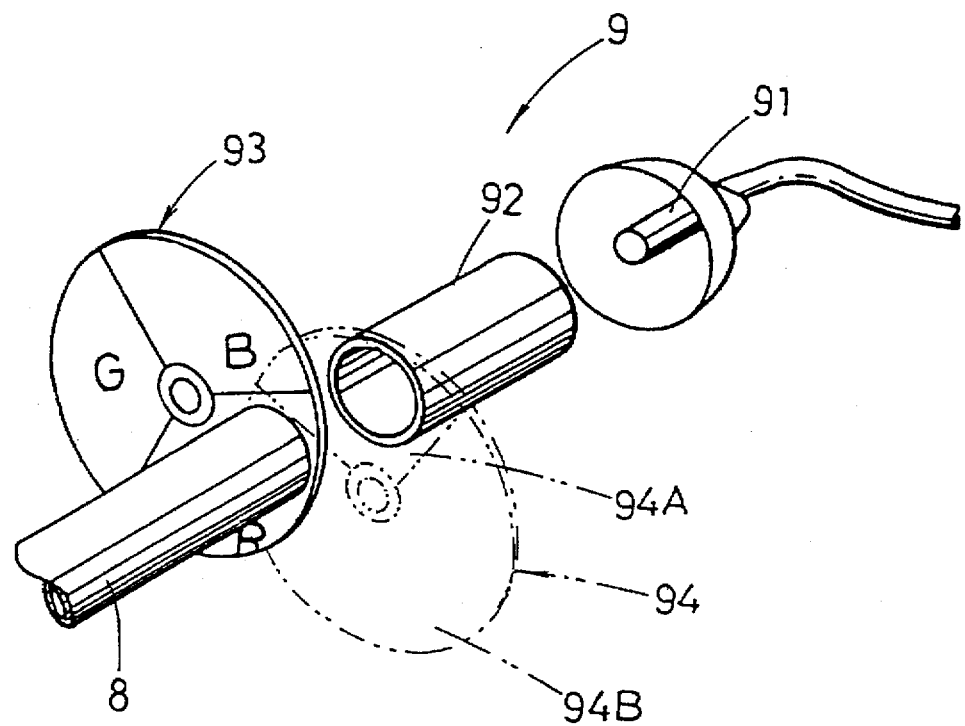
FIG. 2 is a perspective view showing Embodiment 1 of the exposure apparatus of the present invention.

FIG. 1 is an overall schematic view of a photographic printing machine equipped with an exposure apparatus.

As shown, the photographic printer is provided with a magazine 1 for supplying a tape of printing paper 2 as a photosensitive material, a negative exposure station 3 which comprises a light source 31 for emitting an intensity of exposure light through image frames of a negative film 32 and a lens 33, and a line exposure station 4 for reproducing digital images. Also, provided is a development station 5 for subjecting the exposed printing paper to a development process and a transfer mechanism 6 for acting as a conveying means. In operation, the printing paper 2 is transferred lengthwise on a line-by-line and frame-by-frame basis.

The photographic printing machine includes a line exposure controller station (not shown) which serves as a voltage changing means. The line exposure controller station controls the timing of exposure operations in the line exposure station 4 and the timing of transfer actions of the transfer mechanism 6.

The line exposure station 4 prints, on the printing paper 2, digital images retrieved by a scanner or produced by a separate electronic device such as a computer.

The line exposure station 4 includes a PLZT shutter 41 composed of multiple rows of PLZT elements (not shown) extending widthwise in relation to the printing paper 2.

The PLZT elements of the PLZT shutter 41 are joined to a bundle of optical fibers 8.

The optical fiber bundle 8 has a proximal end (at a light receiving end) thereof located opposite to a PLZT light source 9 (described later) for emission of B, G, and R colors of light.

The PLZT elements are energized with given amplitudes of voltage corresponding to the colors of light which synchronously have passed through a color shifter disk 93 which is rotated. A selected wavelength of the exposure light is then allowed to pass from the optical fiber bundle 8.

The PLZT light source 9 includes a lamp 91 and a mirror tunnel 92 as well as the color shifter disk 93, and is adjacent to the proximal end of the optical fiber bundle 8.

The optical fiber bundle 8 comprises a multiplicity of optical fibers having a face 81 at the light receiving end that is round shaped.

The color shifter disk 93 comprises B, G, and R, color filters 93B, 93G, and 93R formed as three equal sectors of the disk. Each fan-shaped sector of the filters 93B, 93G, and 93R extends through 120 degrees about the center C1 of the color shifter disk 93.

The center C1 of the color shifter disk 93 is coupled to a rotary shaft (not shown) driven by a motor (not shown).

The color shifter disk 93 is disposed between the mirror tunnel 92 and the light receiving face 81 of the optical fiber bundle 8 so that its filter part comes into the light path extending from the lamp 91 to the light receiving face 81 of the optical fiber bundle 8. In operation, while the color shifter disk 93 is rotated, its filters 93B, 93G, and 93R rotate into the light path. Accordingly, the light passed through any of the filters 93B, 93G, and 93R is directed to the light receiving face 81 of the optical fiber bundle 8 and is transmitted to corresponding PLZT elements of the PLZT shutter 41.

During a color shifting interval where the boundary 930 between two adjacent sectors of the color filters 93B, 93G, and 93R runs into the light receiving face 81 of the optical fiber bundle 8, the light receiving face 81 is blinded by a light shielding disk 94.

The light shielding disk 94 comprises a shielding sector 94A (denoted by the hatching) and a transparent sector 94B.

More specifically, the light shielding sector 94A extends through 60 degrees about the center C2 of the light shielding disk 94 while the rest of the disk 94 is the transparent sector 94B.

The diameter of the light shielding disk 94 is identical to the outer diameter of the color shifter disk 93.

The light shielding disk 94 is disposed between the color shifter disk 93 and the light receiving face 81 of the optical bundle 8 so that its sector comes into the light path.

The center C2 of the light shielding disk 94 is coupled to a rotary shaft (not shown) driven by a motor (not shown).

In operation, the light shielding disk 94 rotates in a reverse direction of, and at a speed three times greater than, the color shifter disk 93. The movement of the light shielding disk 94 is controlled so that the light shielding sector 94A runs into the light path in synchronization with the boundary 930 of the color shifter disk 93 passing into the same.

As the light shielding sector 94A runs into the light path, it prevents the light receiving face 81 from receiving the light from the lamp 91 and allows no exposure to the light during the color shifting action. Otherwise, the transparent sector 94B remains in the light path allowing exposure operations.

Figure 3A:
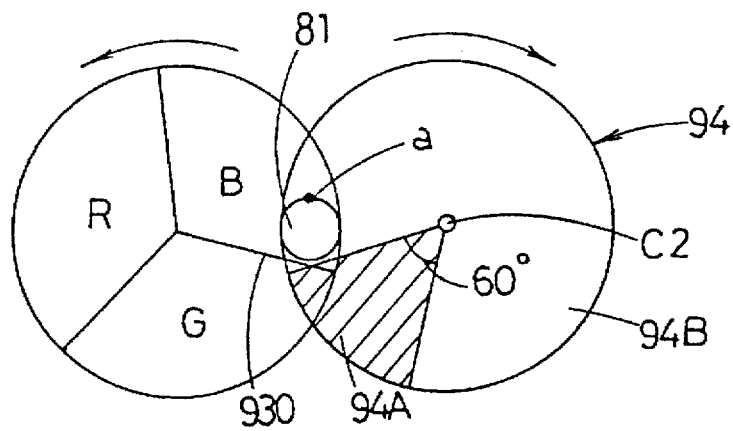
FIG. 3 is a diagram showing the timing relation of the rotating movement between a color shifter disk and a light shielding disk of the embodiment.
Figure 3B:
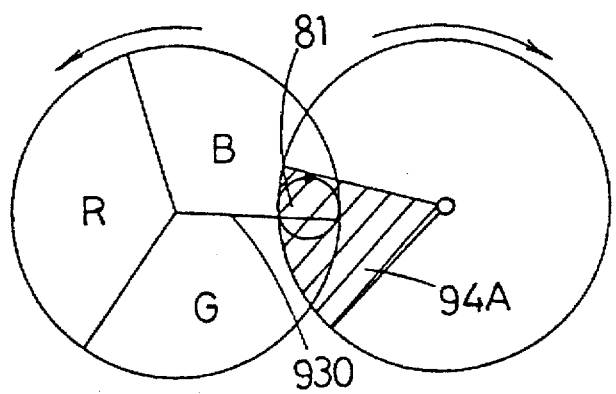
Figure 3C:
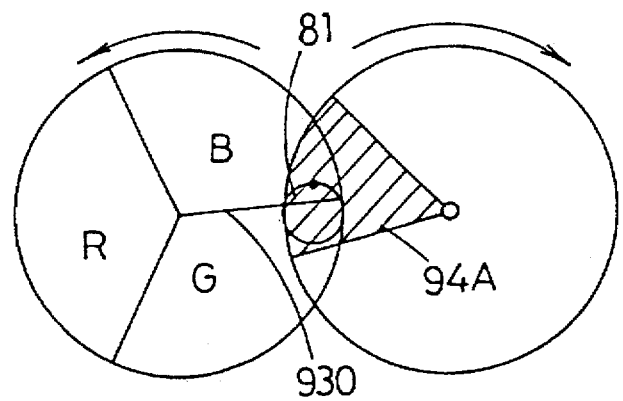

Although the light shielding sector 94A extends through 60 degrees, its 30-degree portion can cover the entire light receiving face 81 of the optical fiber bundle 8 (FIGS. 3(B) and 3(C)).

The timing relation between the color shifter disk 93 and the light shielding disk 94 will now be explained referring to FIG. 3, in which the arrows indicate the directions of rotation of the two disks 93 and 94, respectively.

(1) When the boundary 930 of the color shifter disk 93 moves into the light path of the light receiving face 81 (at the start of color shifting), the light shielding sector 94A of the light shielding disk 94 is simultaneously advanced to cover the light receiving face 81 (FIG. 3(A)).

(2) As the boundary 930 is turned to 10 degrees from the position shown in FIG. 3(A), the light shielding sector 94A rotates 30 degrees to cover the light receiving face 81 entirely (FIG. 3(B)).

(3) The boundary is further turned by 10 degrees from the position shown in FIG. 3(B) and the light shielding sector 94A further rotates 30 degrees (FIG. 3(C)).

During the interval from FIG. 3(B) to 3(C), the light receiving face 81 remains blinded completely.

Figure 3D:
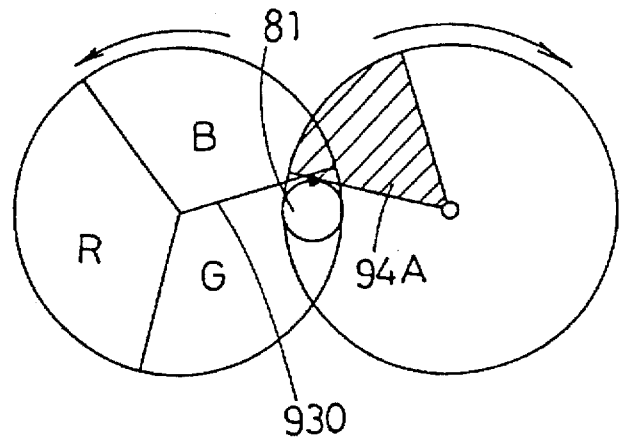

(4) As the boundary 930 is turned again by 10 degrees from the position shown in FIG. 3(C) departing from the light receiving face 81, the light shielding sector 94A rotates 30 degrees and also departs from the same (FIG. 3(D)).

As apparent, the light shielding action is terminated upon the completion of the color shifting.

It should be noted that the PLZT shutter 41 remains turned off while the boundary 930 is running across the light receiving face 81 of the optical fiber bundle 8 and is turned on upon the completion of the color shifting with the boundary 930 having departed from the light receiving face 81.

Accordingly, when the duration is T in which the boundary 930 runs throughout the light receiving face 81 (i.e. the boundary 930 rotates 30 degrees) with the need of blinding the entire area of the light receiving face 81, it takes a length of time T/3 (FIGS. 3(A) and 3(B)) to cover the entire area of the light receiving face 81 with the light shielding sector 94A (or for the light shielding disk 94 to rotate 30 degrees). Also, the duration in which the light receiving face 81 is completely blinded with the light shielding sector 94A is T/3 (FIGS. 3(B) and 3(C)).

As a result, a leakage of light occurring during the color shifting operation appears for a duration T−T/3=2T/3. This means the exposure time of the printing paper 2 being exposed to the leakage light is reduced to ⅔.

In respect to blinding a point (for example, the point shown in FIG. 3(A)) in the light receiving face 81, the duration of the point being blinded with the light shielding sector 94A is expressed by 2T/3 (FIGS. 3(B) to 3(D)).

The leakage of light during the color shifting then appears for T−2T/3=T/3. Hence, the exposure time of the printing paper 2 being exposed to the leakage light is reduced to ⅓.

The main exposure time will next be examined.

The duration of each of the color filters 93B, 93G, and 93R running across the light receiving face 81 of the optical fiber bundle 8 (i.e. the duration in which the color shifter disk 93 rotates 120 degrees) is (120/20)T=4T.

The duration 4T includes a time T required for the color shifting operation. During the color shifting operation, the PLZT shutter 41 remains turned off disabling the exposure operation.

The duration for the exposure operation is thus 4T−T=3T.

The light shielding sector 94A rotates across the light receiving face 81 when the boundary 930 rotates across the light receiving face 81 and departs from the same when the boundary 930 leaves the same. Thus, the exposure time will not be affected by the operation of the light shielding sector 94A.

The main exposure duration and the exposure time for leakage light may be controlled by varying the shape and size of the light shielding sector 94A and the receiving face 81 and/or the timing relation between the color shifter disk 93 and the light shielding disk 94.

For example, when the light shielding disk 94 is greater in the outer diameter and faster in the rotating speed than the color shifter disk 93, the leakage of light will be minimized.

It is also possible to change the diameter and rotating speed of the color shifter disk 93 and the light shielding disk 94 in accordance with the size of the light receiving face 81 of the optical fiber bundle 8.

The exposure to each mode of B, G, and R color lights will be explained referring to FIG. 4.

When the B filter moves into the light path, the amplitude of voltage to corresponding PLZT elements is turned to 45 V by the operation of the line exposure controller 6. Then, the B color of light is projected on to the printing paper 2 thus producing a pattern of dots D1, D2 . . . , as shown in FIG. 4(A).

After the color shifter disk 93 is rotated again to forward the G filter into the light path, the line exposure controller 6 turns the voltage of PLZT elements to 50 V. Accordingly, the G color of light falls on the printing paper 2 producing another pattern of dots D1, D3 . . . , as shown in FIG. 4(B).

Similarly, when the color shifter disk 93 is further rotated to forward the R filter into the light path, the line exposure controller 6 turns the voltage of PLZT elements to 55 V. Then, the R color of light is projected on to the printing paper 2 producing a pattern of dots D1 . . . , as shown in FIG. 4(C).

After the steps of exposure process, the dot D1 appears consisting of B, G, and R, colors, the dot D2 comprises B and R colors, the dot D3 is expressed by G color, and the dot D4 holds no color.

While the boundary 930 on the color shifter disk 93 is running across the light receiving face 81 of the optical fiber bundle 8, the light receiving face 81 is blinded by the light shielding sector 94A of the light shielding disk 94.

During a series of the exposure operations to B, G, and R modes of light, the printing paper 2 is held at the same location so as to allow printing of a row of dots extending widthwise on the printing paper 2. After the steps shown in FIG. 4 is completed, the printing paper 2 is advanced by a distance of one dot size.

As the result, the succeeding row of dots on the printing paper 2 is exposed to light at the exposure location, as shown in FIGS. 4(D) to 4(F).

Also, a series of the exposure operations to the B, G, and R colors of light are carried out in synchronization with the rotating operation of the color shifter disk 93 thus producing another row of print dots.

After the succeeding row of dots is printed by exposure to the B, G, and R colors of light, the printing paper 2 is further advanced by the distance of one dot size.

In this manner of row-by-row printing, the exposure process is implemented lengthwise on the printing paper 2.

The rotating operation of the color shifter disk 92 is not limited to one particular means but may be, for example, conducted by controlling the number of pulses to a stepping motor.

The exposure apparatus of this embodiment is not limited to the use of the photographic printer machine but may be applied to the exposure to various other photosensitive materials.

In the development station 5, the printing paper 2 exposed to light at the negative exposure station 3 and/or the line exposure station 4 is subjected to a development process and the paper is then cut into frames.

Embodiment 2

An exposure apparatus of this embodiment of the present invention for use in a photographic printing machine is substantially identical in the construction to that of Embodiment 1, comprising a magazine for supplying a tape of printing paper, a negative exposure station, a line exposure station, a development station, a transfer means for conveying the printing paper lengthwise on a line-by-line and frame-by-frame basis, and a line exposure controller.

Also, a PLZT light source is provided similar to that of Embodiment 1, including a lamp (not shown), a mirror tunnel (not shown), a color shifter disk 93, and a bundle of optical fibers 8 with its proximal end arranged as a light receiving face, but excluding the light shielding disk.

As shown in FIG. 5, the light receiving face 81 of the optical fiber bundle 8 is in the shape of an oval configuration in which a long axis or length extends along the boundary 930 of the color shifter disk 93 which is disposed in the light path between the lamp and the light receiving face 81 of the optical fiber bundle 8. It should be noted that the area of the light receiving face 81 remains unchanged from, and is the same as, Embodiment 1.

The color shifter disk 93 is also identical in construction to that of Embodiment 1 and will be explained in no more detail in which like components are denoted by like numerals.

Figure 5A:
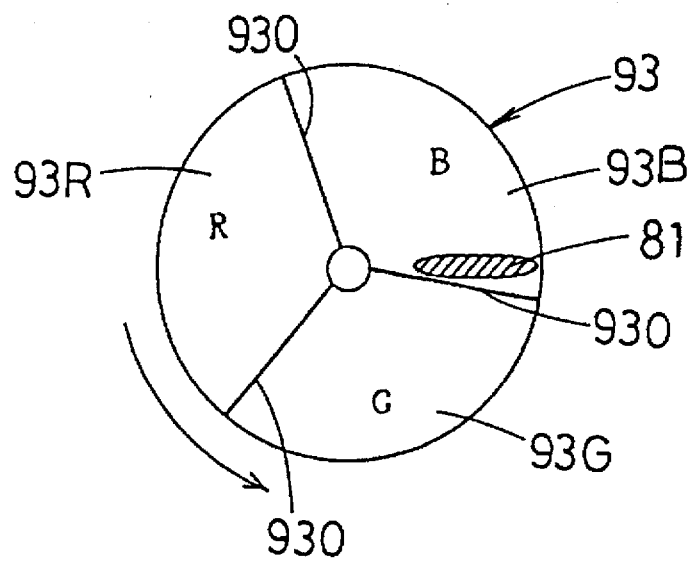
FIG. 5 is a diagram showing Embodiment 2 of the exposure apparatus of the present invention.
Figure 5B:
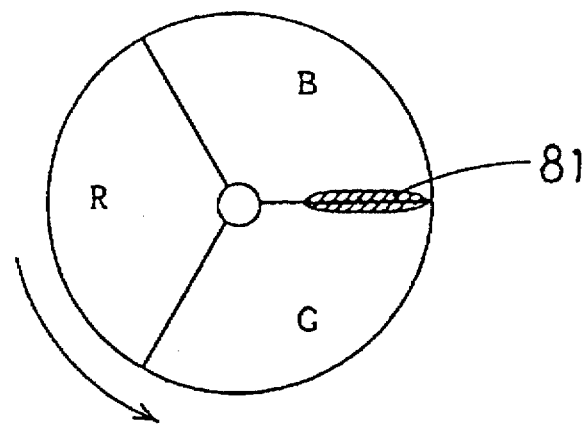
Figure 5C:
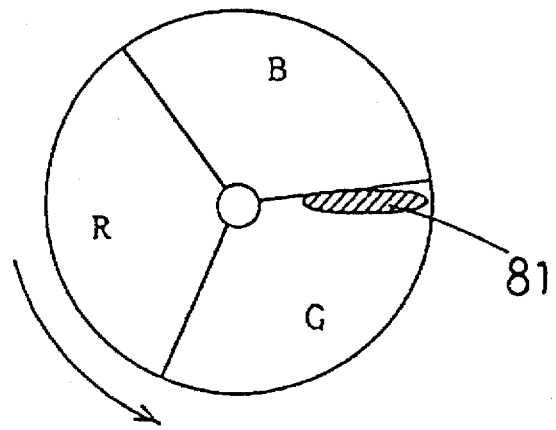

The exposure apparatus of this embodiment allows the boundary 930 of the color shifter disk 93 to perform a smaller angular motion for crossing the light receiving face 81, as shown in FIGS. 5(A) to 5(C). In other words, the boundary 930 can cross the light receiving face 81 within a shorter period of time.

This will decrease the leakage of light and minimally impair the quality of printing without requiring the use of the light shielding disk of Embodiment 1.

Embodiment 3

An exposure apparatus of this embodiment of the present invention for use in a photographic printing machine is substantially identical in construction to that of Embodiment 1, comprising a magazine for supplying a tape of printing paper, a negative exposure station, a line exposure station, a development station, a transfer means for conveying the printing paper lengthwise on a line-by-line and frame-by-frame basis, and a line exposure controller.

Also, a PLZT light source is provided similar to that of Embodiment 1, including a lamp (not shown), a mirror tunnel (not shown), a color shifter disk 93, and a bundle of optical fibers 8 with its proximal end arranged as a light receiving face, but excluding the light shielding disk.

Figure 6:
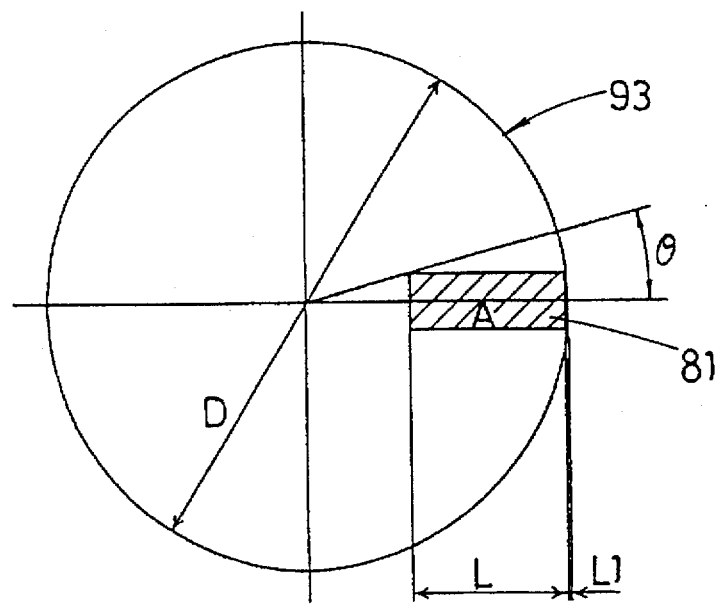
FIG. 6 is a diagram showing Embodiment 3 of the exposure apparatus of the present invention.

As shown in FIG. 6, the light receiving face 81 of the optical fiber bundle 8 is in the shape of a rectangular configuration in which a long side extends along the boundary 930 of two adjacent color filters on the color shifter disk 93 which is disposed in the light path between the lamp and the light receiving face 81 of the optical fiber bundle 8.

The rectangular light receiving face 81 of the optical fiber bundle 8 is most efficient when its long side is equal to ¼ of the diameter of the color shifter disk 93.

Assuming that, as shown in FIG. 6, the diameter of the color shifter disk 93 is D, the long side of the light receiving face 81 is L, and the area of the light receiving face 81 is A, the angle θ of a straight line extending from the center C1 of the color shifter disk 93 and tangent to the rectangular light receiving face 81 is expressed by Equation 1:

$$\theta = ATAN \left\{ \frac{A}{2L \left( \frac{D}{2} - L \right)} \right\} \quad (1)$$

The angle θ is minimum when 2L(D/2–L) is maximum. Then, L=D/4 is given.

As the angle θ is minimized, L1 becomes increasingly closer to zero, and may be negligible.

In this arrangement, similar to Embodiment 2, it is also possible for the boundary 930 to cross the light receiving face 81 within a shorter period of time. This will decrease the leakage of light and minimally impair the quality of printing without requiring the use of the light shielding disk of Embodiment 1.

The effect of the leakage of light will be further attenuated if such a light shielding disk as that of Embodiment 1 is furnished.

Embodiment 4

An exposure apparatus of this embodiment of the present invention for use in a photographic printing machine is substantially identical in construction to that of Embodiment 1, comprising a magazine for supplying a tape of printing paper, a negative exposure station, a line exposure station, a development station, a transfer means for conveying the printing paper lengthwise on a line-by-line and frame-by-frame basis, and a line exposure controller.

Also, a PLZT light source is provided similar to that of Embodiment 1, including a lamp (not shown), a mirror tunnel (not shown), a color shifter disk 93, and a bundle or optical fibers 8 with its proximal end arranged as a light receiving face, but excluding the light shielding disk.

As shown in FIG. 8, the light receiving face 81 of the optical fiber bundle 8 has a fan-shaped of sector-shaped configuration which spreads from the center point of the color shifter disk 93.

Figure 7:
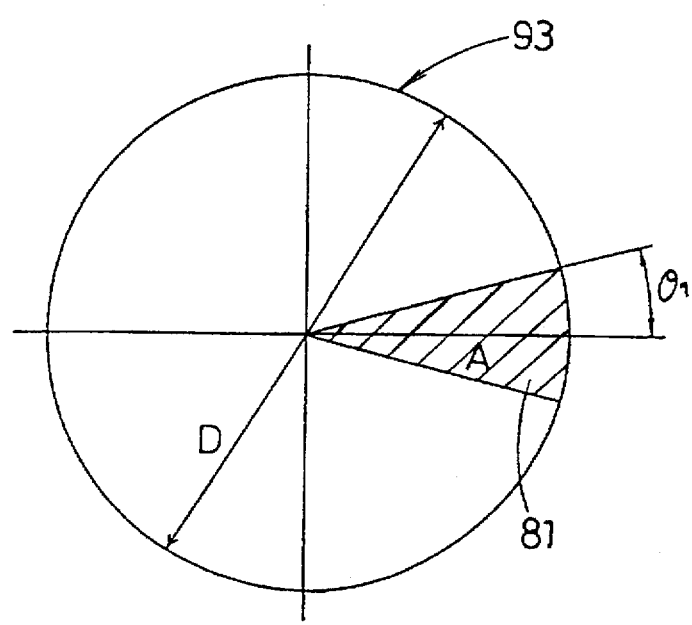
FIG. 7 is a diagram showing Embodiment 4 of the exposure apparatus of the present invention.

Assuming that the diameter of the color shifter disk 93 is D, as shown in FIG. 7, the long side of the light receiving face 81 is L, and the area of the light receiving face 81 is A, the angle $\theta_1$ of a straight line extending from the center C1 of the color shifter disk 93 and tangent to the fan-shaped light receiving face 81 is expressed by Equation 2:

$$\theta_1 = \frac{360A}{\pi \left(\frac{D}{2}\right)^2} \quad (2)$$

Figure 9:
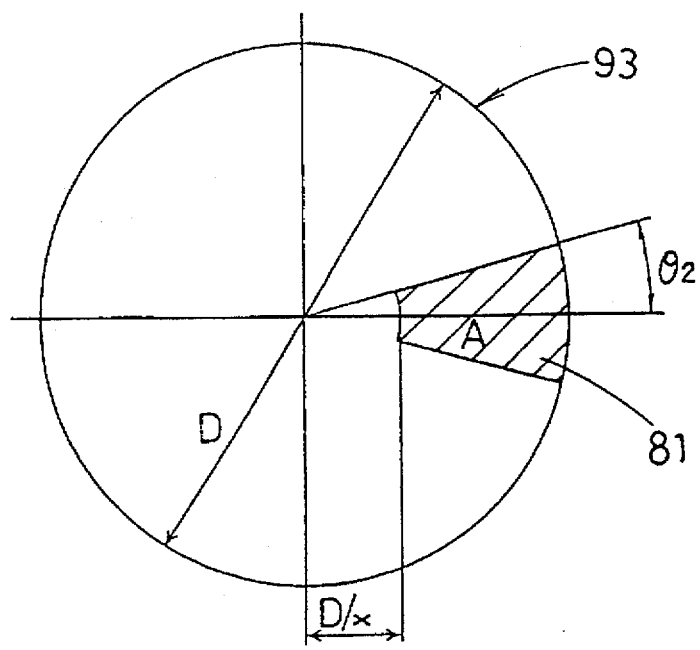
FIG. 9 is a diagram showing a modification of the last embodiment.
Figure 10:
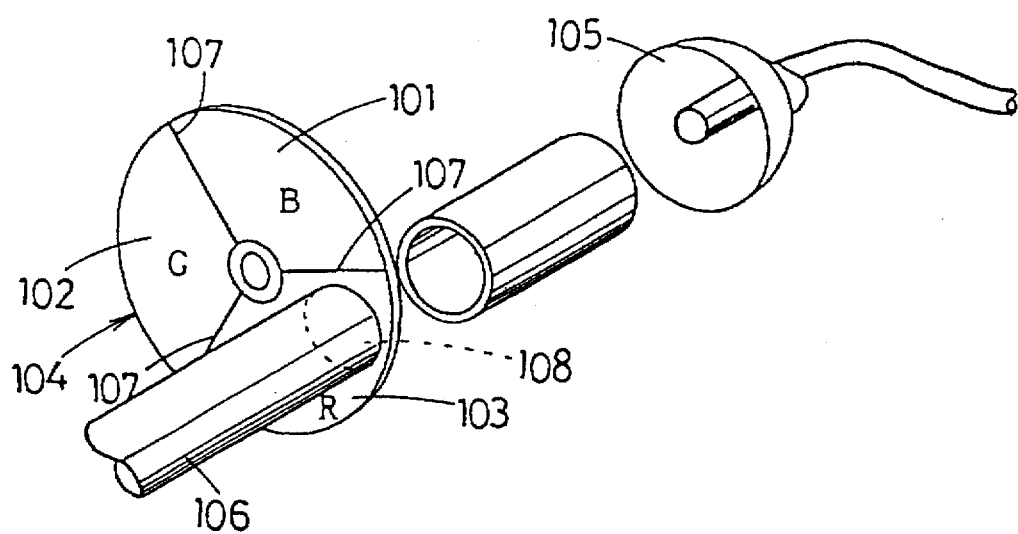
FIG. 10 is a perspective view of a prior art.

If the light receiving face 81 has a fan shape with its proximal part eliminated (FIG. 9) and the distance from the center C1 of the color shifter disk 93 to the inner side of the light receiving face 81 is equal to 1/X of the diameter D of the color shifter disk 93, the angle $\theta_2$ of a straight line extending from the center C1 of the color shifter disk 93 and tangential to the truncated fan-shaped light receiving face 81 is expressed by Equation 3:

$$\theta_2 = \frac{360A}{\pi \left\{ \left(\frac{D}{2}\right)^2 - \left(\frac{D}{x}\right)^2 \right\}} \quad (3)$$

Figure 8A:
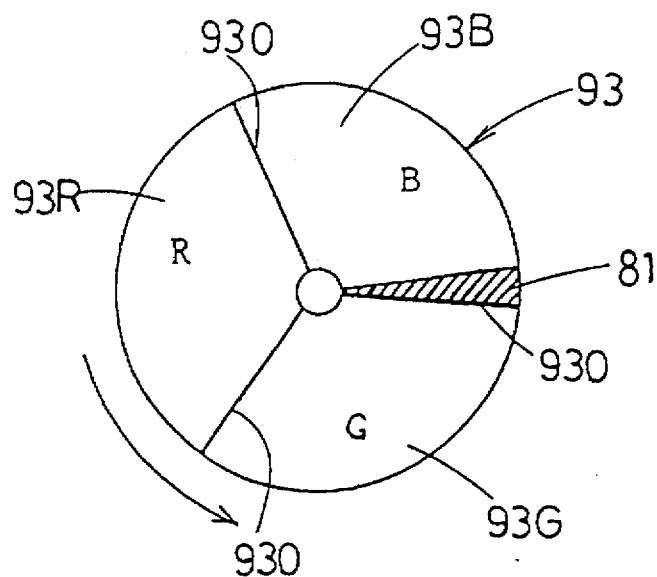
FIG. 8 is a diagram showing the timing relation of the rotating movement between a color shifter disk and a light shielding disk of the last embodiment.
Figure 8B:
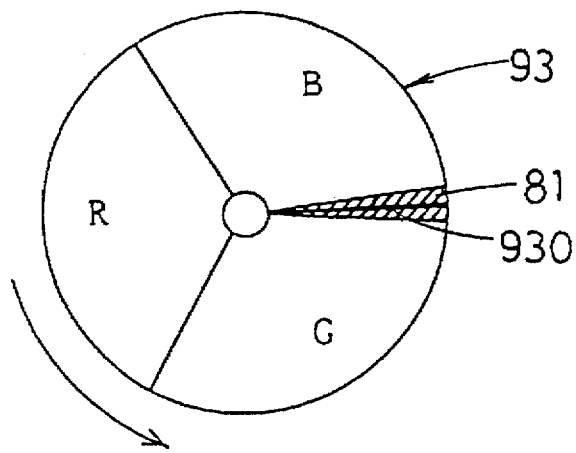
Figure 8C:
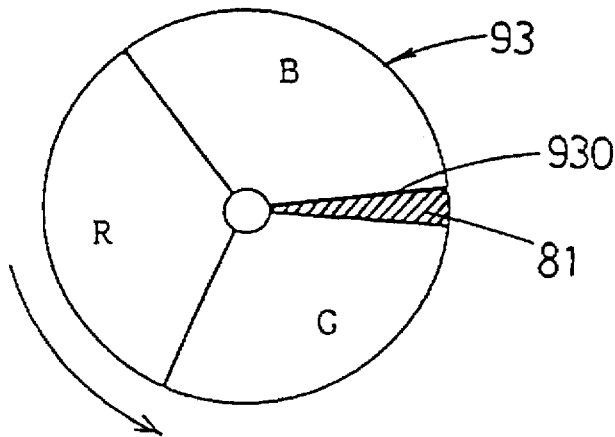

With those arrangements, the duration of the boundary 930 running throughout the light receiving face 81 is shortened as shown in FIGS. 8(A) to 8(C). Since the fan-shaped light receiving face 81 corresponds exactly to an area defined by an angular movement of the boundary 930 of the color shifter disk 93, the duration is minimized.

Accordingly, the leakage of light will be further reduced thus minimally impairing the quality of printing without requiring the use of the light shielding disk of Embodiment 1.

The effect of the leakage of light will be further attenuated if such a light shielding disk as of Embodiment 1 is furnished.

The shape of the light receiving face of the optical fiber bundle is not limited to those of the embodiments described above and may be modified for minimizing the width of the light receiving face of the optical fiber bundle which extends in the direction of rotation across the boundary on the color shifter disk without changing the size of the shape.

What is claimed is:

1. An exposure apparatus comprising:

a light source;

a PLZT exposure shutter;

a bundle of optical fibers having a light receiving face for receiving exposure light from said light source and for transmitting the exposure light to said PLZT exposure shutter;

a color shifter disk divided into three sectors having blue, green and red colored filters, respectively, which are separated by boundaries, wherein said color shifter disk rotates so as to selectively position said blue, green and red color filters in a light path between said light source and said light receiving face of said bundle of optical fibers, thereby producing blue, green and red colored exposure light, respectively, wherein the blue, green and red colored exposure light is used to form a pattern of dots on a photosensitive material; and a shielding disk having a light shielding member which is arranged so as to move into the light path so as to shield the exposure light when the boundaries of the color shifter disk travels into the light path, and to move out of the light path so as to allow the exposure light to travel uninterrupted when the boundaries of the color shifter disk travel out of the light path.

2. An exposure apparatus according to claim 1, wherein said light receiving face of said bundle of optical fibers has a shape such that a length of said light receiving face is longer than a width and wherein the length of said light receiving face extends along the boundaries of said color shifter disk.

3. An exposure apparatus according to claim 2, wherein said light receiving face of said bundle of optical fibers is a shape of an oval.

4. An exposure apparatus according to claim 2, wherein said light receiving face of said bundle of optical fibers is a shape of a rectangle.

5. An exposure apparatus according to claim 2, wherein said light receiving face of said bundle of optical fibers is a shape of a sector in which two radii of the sector meet at a center which lies in a same rotational axis as a center of said color shifter disk.

6. An exposure apparatus comprising:

a light source;

a PLZT exposure shutter;

a bundle of optical fibers having a light receiving face for receiving exposure light from said light source and for transmitting the exposure light to said PLZT exposure shutter; and a color shifter disk divided into three sectors having blue, green and red colored filters, respectively, which are separated by boundaries, wherein said color shifter disk rotates so as to selectively position said blue, green and red color filters in a light path between said light source and said light receiving face of said bundle of optical fibers, thereby producing blue, green and red colored exposure light, respectively, wherein the blue, green and red colored exposure light is used to form a pattern of dots on a photosensitive material;

wherein said light receiving face of the bundle of optical fibers has a shape such that a length of said light receiving face is longer than a width and wherein the length of said light receiving face extends along the boundaries of said color shifter disk.

7. An exposure apparatus according to claim 6, wherein said light receiving face of said bundle of optical fibers is a shape of an oval.

8. An exposure apparatus according to claim 6, wherein said light receiving face of said bundle of optical fibers is a shape of a rectangle.

9. An exposure apparatus according to claim 6, wherein said light receiving face of said bundle of optical fibers is a shape of a sector in which two radii of the sector meet at a center which lies in a same rotational axis as a center of said color shifter disk.

* * * * *